US011165352B2

(12) United States Patent  
Graves (10) Patent No.: US 11,165,352 B2  
(45) Date of Patent: Nov. 2, 2021

(54) CAPACITIVELY ISOLATED FEEDBACK CIRCUITS AND REGULATED POWER SUPPLIES INCORPORATING THE SAME

(71) Applicant: L3 CINCINNATI ELECTRONICS CORPORATION, Mason, OH (US)

(72) Inventor: Justin Graves, Middletown, OH (US)

(73) Assignee: L3 CINCINNATI ELECTRONICS CORPORATION, Mason, OH (US)

( * ) Notice: Subject to any disclaimer, the term of this patent is extended or adjusted under 35 U.S.C. 154(b) by 13 days.

(21) Appl. No.: 16/745,065

(22) Filed: Jan. 16, 2020

(65) Prior Publication Data

US 2021/0226542 A1     Jul. 22, 2021

(51) Int. Cl.  
*H02M 3/335*     (2006.01)

(52) U.S. Cl.  
CPC ... *H02M 3/33553* (2013.01); *H02M 3/33523* (2013.01)

(58) Field of Classification Search  
CPC ............ H02M 3/335; H02M 3/33523; H02M 3/33569; H02M 3/33553; H02M 1/08; H02M 2001/0064  
See application file for complete search history.

(56) References Cited

U.S. PATENT DOCUMENTS

| | | |
|---|---|---|
| 4,862,399 A | 8/1989 | Freeman |
| 4,890,217 A | 12/1989 | Conway |
| 5,113,333 A | 5/1992 | Ou |
| 5,394,319 A | 2/1995 | Attwood et al. |
| 6,005,782 A * | 12/1999 | Jain .................... H02M 1/34 363/21.12 |
| 6,456,511 B1 | 9/2002 | Wong |
| 6,671,193 B1 | 12/2003 | Pelkonen |
| 7,349,229 B1 | 3/2008 | Yang |
| 7,477,096 B2 | 1/2009 | Summer |
| 8,908,390 B2 | 12/2014 | Strzalkowski |

(Continued)

OTHER PUBLICATIONS

Rampelli et al., Multiple-Output Magnetic Feedback Forward Converter with Discrete PWM for Space Applications, 2012 IEEE International Conference on Power Electronics, Drives and Energy Systems, Bengaluru, India.

(Continued)

*Primary Examiner* — Gustavo A Rosario-Benitez  
(74) *Attorney, Agent, or Firm* — Dinsmore & Shohl LLP (57) ABSTRACT

A regulated power supply includes a capacitively isolated feedback circuit and a pulse width modulator (PWM) operable to produce a plurality of pulses at an output and receive a sampled voltage at a feedback input thereof. The capacitively isolated feedback circuit includes a capacitively isolated gate drive circuit directly coupled to the PWM output and configured to produce a plurality of isolated pulses from the plurality of pulses received from the PWM output. The capacitively isolated feedback circuit also includes a forward converter feedback circuit, which includes a switching transistor directly coupled to the capacitively isolated gate drive circuit for receiving the plurality of isolated pulses at a gate of the switching transistor and a feedback transformer directly coupled to the PWM for providing the sampled voltage at the feedback input. The plurality of isolated pulses causes the feedback transformer to sample a load voltage as the sampled voltage.

18 Claims, 5 Drawing Sheets

(56) References Cited

U.S. PATENT DOCUMENTS

| | | | |
|---|---|---|---|
| 9,293,999 | B1 | 3/2016 | Lam et al. |
| 9,419,448 | B1 | 8/2016 | Cilio et al. |
| 9,819,274 | B2 | 11/2017 | Quigley |
| 9,887,635 | B2 | 2/2018 | Yonezawa et al. |
| 9,960,696 | B2 | 5/2018 | Lawson et al. |
| 2002/0196642 | A1* | 12/2002 | Goder ............... H02M 3/33523 363/21.11 |
| 2004/0257837 | A1 | 12/2004 | Xu et al. |
| 2007/0086219 | A1 | 4/2007 | Yasumura |
| 2007/0159143 | A1* | 7/2007 | Yang ................. H02M 3/33523 323/247 |
| 2008/0192509 | A1* | 8/2008 | Dhuyvetter ....... H02M 3/33523 363/17 |
| 2010/0046252 | A1* | 2/2010 | Keller ............... H02M 3/33523 363/21.07 |
| 2011/0292691 | A1 | 12/2011 | Matsumoto et al. |
| 2012/0039378 | A1* | 2/2012 | Nakayama ................ H03L 7/08 375/226 |
| 2012/0146545 | A1* | 6/2012 | Nerone ............. H02M 3/33523 315/297 |
| 2012/0281438 | A1 | 11/2012 | Fang et al. |
| 2013/0033905 | A1 | 2/2013 | Lin et al. |
| 2014/0078789 | A1* | 3/2014 | Li ..................... H02M 3/33523 363/21.15 |
| 2014/0112028 | A1 | 4/2014 | Fahlenkamp et al. |
| 2015/0003121 | A1 | 1/2015 | Yang et al. |
| 2015/0055379 | A1 | 2/2015 | Fang |
| 2015/0180355 | A1* | 6/2015 | Freeman ............... H02M 3/158 363/21.04 |
| 2015/0229223 | A1 | 8/2015 | Cao et al. |
| 2015/0381065 | A1 | 12/2015 | Yonezawa et al. |
| 2016/0043623 | A1 | 2/2016 | Ortiz |
| 2016/0072393 | A1 | 3/2016 | McIntyre |
| 2016/0149504 | A1 | 5/2016 | Quigley |
| 2016/0226388 | A1 | 8/2016 | Ren et al. |
| 2016/0322904 | A1 | 11/2016 | Tzeng et al. |
| 2016/0359419 | A1* | 12/2016 | Lin ......................... H02M 1/40 |
| 2016/0365794 | A1 | 12/2016 | Lawson et al. |
| 2017/0214320 | A1 | 7/2017 | Shi et al. |
| 2017/0358979 | A1* | 12/2017 | Lam .................. H02M 3/33569 |
| 2018/0109197 | A1 | 4/2018 | Quigley |
| 2018/0287486 | A1* | 10/2018 | Peng .................... H02M 3/156 |

OTHER PUBLICATIONS

Baronti et al., DC/DC Switching Power Converter with Radiation Hardened Digital Control Based on SRAM FPGAs, Supported in part by the U.S. Defense Threat Reduction Agency (2004), 4 pages.

\* cited by examiner

CAPACITIVELY ISOLATED FEEDBACK CIRCUITS AND REGULATED POWER SUPPLIES INCORPORATING THE SAME

TECHNICAL FIELD

The present specification generally relates to regulated power supplies and, more specifically, to regulated power supplies using a capacitively isolated feedback circuit.

BACKGROUND

Regulated power supplies provide a stable direct current (DC) output voltage over a wide range of load conditions. Such regulated power supplies may incorporate a feedback circuit that samples the output voltage and provides the sampled output voltage to a pulse width modulator that varies a pulse train provided to a transformer and regulates the output voltage accordingly. Such feedback circuits require electrical isolation, which may be provided by devices such as optocouplers. However, use of optocouplers may not be feasible in all environments, such as space environments having high levels of radiation.

SUMMARY

The present specification relates to regulated power supplies using a capacitively isolated feedback circuit. In one embodiment, a regulated power supply includes a pulse width modulator and a capacitively isolated feedback circuit. The pulse width modulator is operable to produce a plurality of pulses at an output and receive a sampled voltage at a feedback input thereof. The capacitively isolated feedback circuit includes a capacitively isolated gate drive circuit directly coupled to the output of the pulse width modulator and a forward converter feedback circuit. The capacitively isolated gate drive circuit is configured to produce a plurality of isolated pulses from the plurality of pulses directly received from the output of the pulse width modulator. The forward converter feedback circuit includes a switching transistor directly coupled to the capacitively isolated gate drive circuit for receiving the plurality of isolated pulses at a gate of the switching transistor and a feedback transformer directly coupled to the pulse width modulator for providing the sampled voltage at the feedback input. The plurality of isolated pulses causes the feedback transformer to sample a voltage at a load as the sampled voltage.

In another embodiment, a regulated power supply having a switching frequency greater than about 1 MHz is disclosed. The regulated power supply includes a pulse width modulator and a capacitively isolated feedback circuit. The pulse width modulator is operable to produce a plurality of pulses at an output and receive a sampled voltage at a feedback input thereof. The capacitively isolated feedback circuit includes a capacitively isolated gate drive circuit directly coupled to the output of the pulse width modulator and a forward converter feedback circuit. The capacitively isolated gate drive circuit is configured to produce a plurality of isolated pulses from the plurality of pulses directly received from the output of the pulse width modulator. The forward converter feedback circuit includes a switching transistor directly coupled to the capacitively isolated gate drive circuit for receiving the plurality of isolated pulses at a gate of the switching transistor and a feedback transformer directly coupled to the pulse width modulator for providing the sampled voltage at the feedback input. The switching transistor is a gallium-nitride field-effect-transistor (GaN FET). The plurality of isolated pulses causes the feedback transformer to sample a voltage at a load as the sampled voltage.

In yet another embodiment, a regulated power supply includes a pulse width modulator and a capacitively isolated feedback circuit. The pulse width modulator is operable to produce a plurality of pulses at an output and receive a sampled voltage at a feedback input thereof. The capacitively isolated feedback circuit includes means for producing a plurality of isolated pulses from a plurality of pulses, means for receiving the plurality of isolated pulses to sample a voltage of a load, thereby producing a sampled voltage, and means for providing the sampled voltage to the pulse width modulator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Various embodiments described herein are directed to regulated power supplies using a capacitively isolated feedback circuit to sample and regulate electrical signals at a load supported by the regulated power supplies. As described in detail below, the capacitively isolated feedback circuits described herein combine a capacitively isolated gate driver and a forward converter feedback circuit that provides desirable power supply regulation and may provide rad/SEE-hardness, if desired. The capacitively isolated gate drive circuit has a coupling capacitor for providing alternating current (AC) signals as a plurality of isolated pulses to a switching transistor of a forward converter feedback circuit in the regulated power supply while blocking the transmission of a direct current (DC) and a returning capacitor for providing a return path. The capacitively isolated gate drive circuit provides a shock-tolerant and vibration-tolerant solution with low power dissipation and high-speed operation that can be efficiently and cost-effectively implemented in regulated power supplies to achieve isolation in a feedback circuit for regulated power supplies, particularly those requiring a tightly regulated output voltage. Various other aspects of the disclosure and variations thereof are illustrated or implied through the descriptions of the embodiments below.

In non-limiting examples, the switching transistor in the forward converter feedback circuit of the regulated power supply may be a metal-oxide field-effect transistor (MOSFET) switch or the relatively inexpensive gallium-nitride field-effect-transistor (GaN FET) switch, which may be manufactured quickly and/or available as an off-the-shelf component. Further, GaN FET switches can be used when the regulated power supply has any switching frequency greater than 1 KHz, especially at switching frequencies greater than 1 MHz when MOSFET switches may not be able to preserve the detected electrical signal or at least may require further tuning to keep the detected electrical signal from becoming undesirably distorted. Moreover, the use of GaN FET switches significantly increases the efficiency of the regulated power supply.

The GaN FET switches, however more beneficial, have a gate rating of +6V/−4V (not including derating requirements) compared to the more generous gate rating of +20V/−20V for MOSFET switches. This requires tighter control of the electrical signal at the gate of the switching transistor and less variation with changes in duty cycle of the detected electrical signal when GaN FET switches are used, particularly when the regulated power supply has a switching frequency greater than 1 MHz. The capacitively isolated feedback circuits described herein can provide the requisite tighter control of the electrical signal at the gate of the switching transistor, enabling the use of the inexpensive and technologically-advanced GaN FET switch to be used as the switching transistor when the regulated power supply is operated at frequencies higher than 1 MHz.

Figure 1:
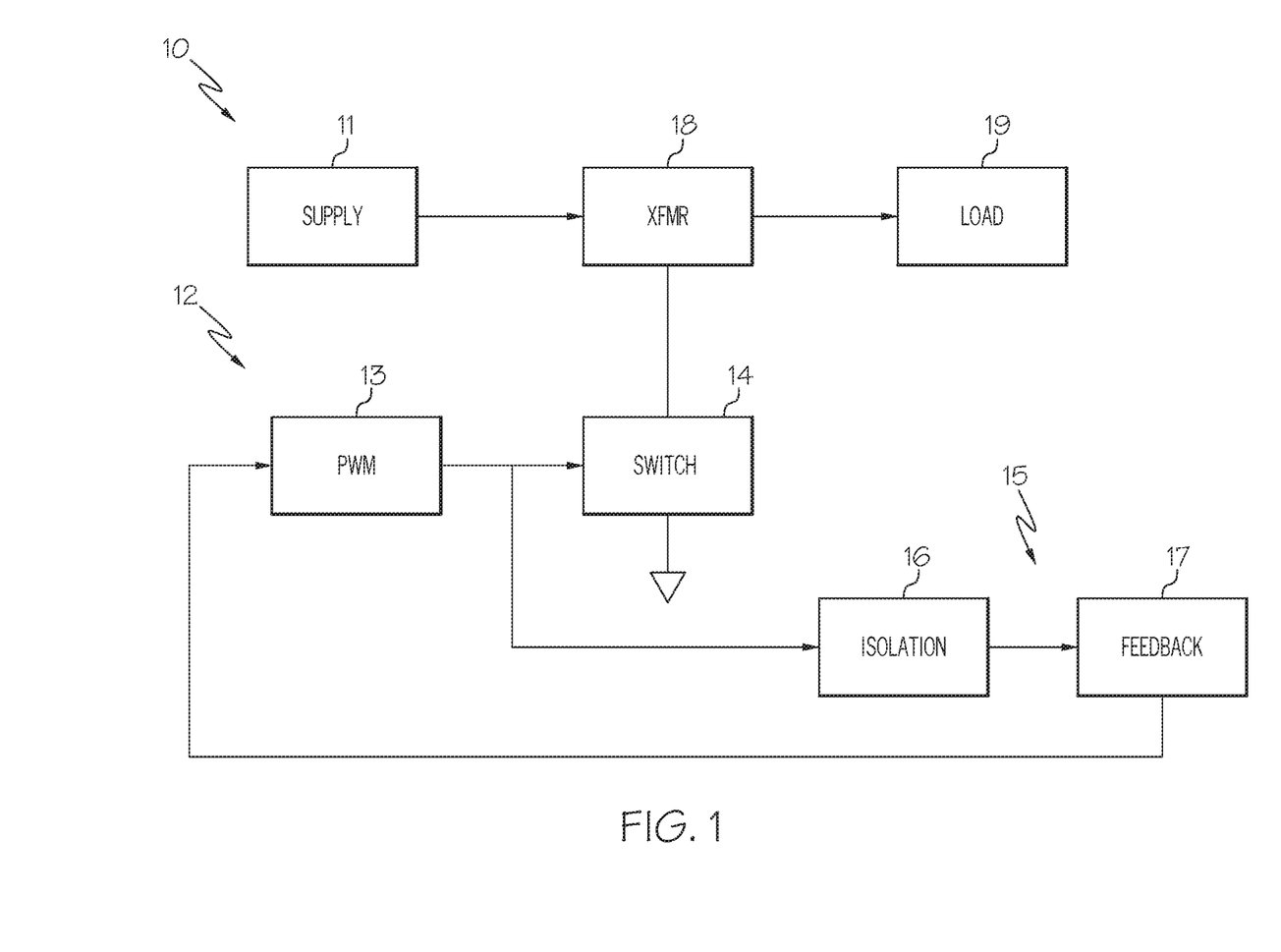
FIG. 1 schematically depicts an example regulated power supply incorporating an example capacitively isolated feedback circuit, according to one or more embodiments described and illustrated herein.

Referring now to FIG. 1, an example regulated power supply 10 incorporating an example capacitively isolated feedback circuit 15 is schematically illustrated. The example regulated power supply 10 comprises a voltage supply 11 and output transformer circuit 18 operable to be electrically coupled to a load 19. As described herein, the phrase "electrically coupled" means either directly electrically coupled by electrical conductors or indirectly electrically coupled by way of intermediate electrical components and electrical conductors. The example regulated power supply 10 further comprises a switching circuit 12 and the capacitively isolated feedback circuit 15. The example switching circuit 12 includes a pulse width modulator (PWM) 13 and a switch 14 that sequentially connects and disconnects the output transformer circuit 18 coupled to the load 19 to regulate the direct current (DC) voltage provided at the load 19. The switching circuit 12 may be any known or yet-to-be-developed switching circuit capable of regulating DC voltage at the output of the regulated power supply 10.

The example capacitively isolated feedback circuit 15 comprises a capacitively isolated gate drive circuit 16 and a forward converter feedback circuit 17. The capacitively isolated gate drive circuit 16 receives a plurality of pulses from the PWM 13 of the switching circuit 12 and produces a plurality of isolated pulses by way of capacitive isolation. The capacitively isolated gate drive circuit 16 includes at least a coupling capacitor configured to produce the plurality of isolated pulses from the plurality of pulses received from the output of the PWM 13 and a returning capacitor for providing a return current path to a ground of the PWM 13. The components of the example capacitively isolated feedback circuit 15 may be fabricated from radiation-hardened components.

The plurality of isolated pulses generated by the capacitively isolated gate drive circuit 16 is provided to the forward converter feedback circuit 17 to sample a voltage at the load 19 supported by the example regulated power supply 10. The forward converter feedback circuit 17 includes a switching transistor for receiving the plurality of isolated pulses and a feedback transformer for providing the sampled voltage at a feedback input of the PWM 13. The forward converter feedback circuit 17 samples the voltage at the load 19 at substantially the same frequency and duty cycle of the plurality of isolated pulses. This sampled voltage is then provided to the feedback input of the PWM 13 of the switching circuit 12. The switching circuit 12 receives the sampled voltage and adjusts the duty cycle and/or the frequency of the plurality of pulses to substantially achieve the desired output voltage at the load 19.

Figure 2:
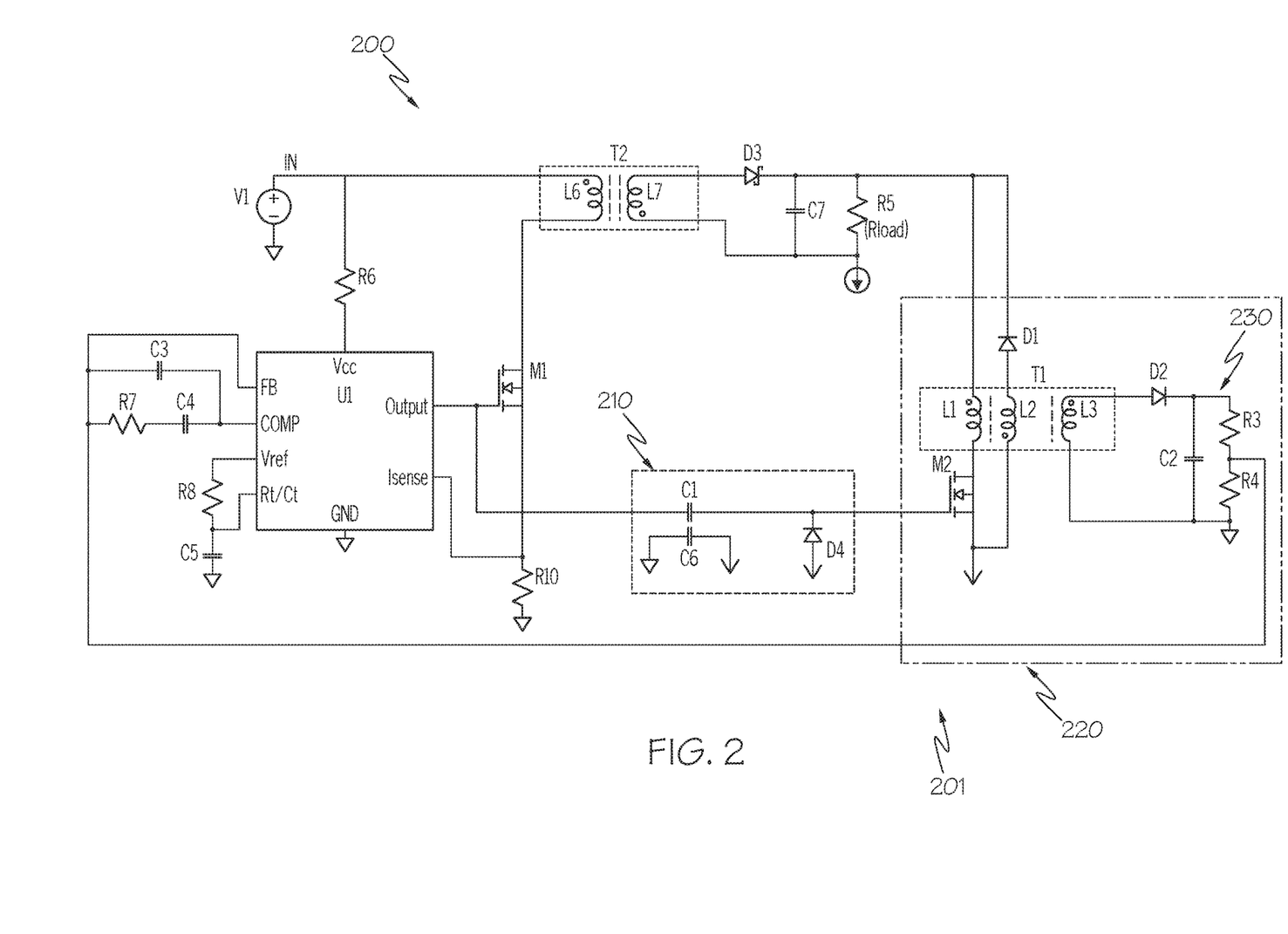
FIG. 2 schematically depicts an example regulated power supply incorporating an example capacitively isolated feedback circuit where a feedback transformer of the example capacitively isolated feedback circuit incorporates a reset winding to reset a core of the feedback transformer, according to one or more embodiments described and illustrated herein.

FIG. 2 schematically depicts an example regulated power supply 200 incorporating an example capacitively isolated feedback circuit 201. It should be understood that the regulated power supplies described herein are not limited by the components depicted by FIG. 2. Additionally, it should be understood that the example capacitively isolated feedback circuit 201 depicted in FIG. 2 may be employed in regulated power supplies having configurations different from that depicted by FIG. 2. As described in more detail below, the example capacitively isolated feedback circuit 201 comprises a capacitively isolated gate drive circuit 210 and a forward converter feedback circuit 220 that samples an output voltage of the regulated power supply 200 and provides the sampled voltage as feedback to a PWM U1.

Generally, the regulated power supply 200 further comprises the PWM U1, a MOSFET switch M1, a voltage supply V1, and an output transformer T2 supporting the load R5. In some embodiments, the PWM U1 is a radiation-hardened PWM similar to the LT1245 PWM manufactured by Linear Technologies® (now acquired by Analog Devices, Inc.) of Milpitas, Calif. However, it should be understood that other PWMs may be utilized.

The PWM U1 has a pin $V_{cc}$ connecting to the voltage supply V1, a number of pins having a variety of purposes described below and a ground pin GND, which electrically grounds the PWM U1. The output pin Output of the PWM U1 is electrically coupled to a gate of the switch M1, which sequentially connects and disconnects a primary winding L6 of the output transformer T2 to ground, thereby regulating the voltage at a secondary winding L7 of the output transformer T2. The PWM U1 is connected to the voltage supply V1 by a resistor R6.

The PWM U1 is operable to produce a plurality of pulses of a desired frequency and duty cycle at an output pin Output. The voltage, frequency and duty cycle of the plurality of pulses is not limited by this disclosure. As a non-limiting example, the minimum voltage (i.e., low voltage) of the plurality of pulses from the PWM U1 is zero and the maximum voltage (i.e., high voltage) of the plurality of pulses is 12V and the duty cycle is less than 50%. A duty cycle of less than 50% enables the core of the feedback transformer T1 to reset between feedback sampling periods. In some embodiments, the PWM U1 outputs a plurality of pulses having a +5V/0V pulse train with a duty cycle less than 50%. However, in other embodiments, if the PWM U1 outputs a plurality of pulses having a different high/low voltage pulse train, a buffer component may be placed between the output pin Output of the PWM U1 and the capacitively isolated gate drive circuit 210 to convert to a +5V/0V pulse train.

A source of the switch M1 is electrically coupled to a current-sensing pin Isense of the PWM U1 and to a ground through a resistor R10. A drain of the switch M1 is electrically coupled to a primary winding L6 of the output transformer T2. While in the embodiment shown in FIG. 2, the switch M1 is a MOSFET, it is noted that the switch M1 may be configured with other types of transistor, such as but not limited to, bi-polar junction transistors (BJTs) and insulated gate bi-polar transistors (IGBTs) depending on the end-application of the regulated power supply 200. As a non-limiting example, the switch M1 may be a BJT in some applications where: 1) the switching frequency of the regulated power supply 200 is low (e.g., about 100 kHz) or 2) the output voltage of the regulated power supply 200 is low (e.g., less than 15 V). The use of BJTs may be limited by their long storage time when saturated, which limits their switching speed. Accordingly, MOSFETs may be used in all applications, while BJTs may be used in some applications.

The primary winding L6 (i.e., output primary) of the output transformer T2 is electrically coupled to voltage supply V1 and a drain of the switch M1. The secondary winding L7 (i.e., output secondary) of output transformer T2 is operable to be electrically coupled to the load R5. In some embodiments, the secondary winding L7 is electrically coupled to an anode of a diode D3 such that the cathode of the diode D3 is operable to be electrical coupled to the load R5. The diode D3 provides a Schottky barrier between the load R5 and the secondary winding L7 of the output transformer T2. A capacitor C7 may also be provided in parallel to the load R5.

The example forward converter feedback circuit 220 comprises a switching transistor M2 and a feedback transformer T1. The switching transistor M2 may be a GaN FET, particularly when the regulated power supply 200 is operated at frequencies higher than 1 MHz. The switching transistor M2 is directly coupled to the capacitively isolated gate drive circuit 210 for receiving the plurality of isolated pulses at a gate of the switching transistor M2. A source of the switching transistor M2 is electrically coupled to ground shared with the secondary winding L7 of the output transformer T2 and the load R5. A drain of the switching transistor M2 is electrically coupled to a primary winding L1 of the feedback transformer T1.

The plurality of isolated pulses causes the feedback transformer T1 to sample a voltage at the load R5 and transmit the sampled voltage to a feedback input pin FB of the PWM U1 directly coupled to the feedback transformer T1. The feedback transformer T1 has the primary winding L1 (i.e., the feedback primary), a secondary winding L3 (i.e., the feedback secondary), and a reset winding L2 electrically coupled to a diode D1. The feedback transformer T1 described above may be off-the-shelf magnetics, or the windings of T1 may be traces in the printed wiring board (PWB) for reliability and simplicity. The primary winding L1 is electrically coupled to a drain of the switching transistor M2 and operable to be electrically coupled to the load R5 supported by the regulated power supply 200. The reset winding L2 is electrically coupled to ground shared with the secondary winding L7 of the output transformer T2 and the load R5 via the diode D1. An anode of the diode D1 is electrically coupled to the reset winding L2 and a cathode of the diode D1 is electrically coupled to the load R5.

The example forward converter feedback circuit 220 further comprises a diode D2, a feedback capacitor C2, and a voltage divider circuit 230. The anode of the diode D2 is electrically coupled to the secondary winding L3 and the cathode of the diode D2 is electrically coupled to the voltage divider 230. Thus the diode D2 electrically couples the feedback transformer T1 to the voltage divider circuit 230 and the sampled voltage is present at an output of the voltage divider circuit 230. The feedback capacitor C2 is electrically connected parallel to the voltage divider circuit 230.

One side of the secondary winding L3 of the feedback transformer T1 is electrically coupled to ground shared with the voltage supply V1 and the PWM U1, and the other side is electrically coupled to the anode of the diode D2. The voltage divider circuit 230 includes the resistors R3 and R4 electrically connected in series. One side of the resistor R3 is electrically coupled to the cathode of the diode D2, while the other side is electrically coupled to the resistor R4. One side of the resistor R4 is electrically coupled to ground shared with the voltage supply V1 and the PWM U1. The resistors R3 and R4 provide the output of the voltage divider circuit 230 that is electrically coupled to the feedback input pin FB of the PWM U1 for providing the sampled voltage from the load R5.

The example capacitively isolated gate drive circuit 210 comprises the coupling capacitor C1 for providing a current path from the output of the PWM U1 and is configured to receive a plurality of pulses from the output of the PWM U1 and produce a plurality of isolated pulses therefrom. The plurality of isolated pulses are provided to the gate of the switching transistor M2 of the forward converter feedback circuit 220. The example isolated gate drive circuit 210 also comprises a returning capacitor C6 for providing a return current path to a ground of the PWM U1 to form a current loop with the coupling capacitor C1. In some embodiments, the coupling capacitor C1 and the returning capacitor C6 are two-terminal capacitors having capacitance between about 0.5 picoFarad to about 10 microFarad as appropriate relative to the gate-to-source capacitance of the switching transistor M2. The coupling capacitor C1 and the returning capacitor C6 are selected such that the coupling capacitor C1 and the returning capacitor C6 have a self-resonant frequency higher than the switching frequency of the switch M1 of the regulated power supply 200.

In some embodiments, the example capacitively isolated gate drive circuit 210 further includes a diode D4. The anode of the diode D4 is electrically coupled to the source of the switching transistor while the cathode of the diode D4 is electrically coupled between the coupling capacitor C1 and the gate of the switching transistor M2 of the forward converter feedback circuit 220. The diode D4 forms a DC restoration circuit along with the coupling capacitor C1 to create a charge pump that can shift a bipolar electrical signal flowing from the PWM U1 into the coupling capacitor C1 to a unipolar output signal of the plurality of isolated pulses. Without the diode D4, a bipolar electrical signal flowing from the PWM U1 cannot be converted to a unipolar output signal, which may be acceptable in some embodiments where the requisite gate rating is wide enough to accommodate bipolar electrical signals.

The diode D4 also consistently clamps negative voltage excursions on the gate of the switching transistor M2 to a diode drop below ground. This ensures that gate drive output has wide margin against the −4 V gate rating of GaN FETs and less variation with changes in duty cycle of electrical signals in applications where GaN FETs are used. In some embodiments, the diode D4 is an ultrafast P-N Junction diode having a reverse recovery time between about 0.5 nanoseconds to about 500 nanoseconds. In other embodiments, the diode D4 may be a Schottky diode having the lowest possible junction capacitance relative to the trace inductance and the gate-to-source inductance in the switching transistor M2, particularly when the switching frequency of the regulated power supply 200 is less than 100 KHz.

Other ancillary electrical components are schematically depicted in FIG. 2. It should be understood that embodiments are not limited by these ancillary electrical components. In the example of FIG. 2, a capacitor C5 electrically connects the Rt/Ct pin of the PWM U1 to ground; the resistor R8 electrically connects the Vref pin of the PWM U1 to the Rt/Ct pin to set the oscillator frequency of the PWM U1; the resistor R7 and the capacitor C4 are electrically coupled in series between the output of the voltage divider circuit 230 and the compensation pin COMP of the PWM U1; and the capacitor C3 is electrically connected in parallel with the resistor R7 and the capacitor C4.

During operation of the regulated power supply 200, The PWM U1 outputs a plurality of pulses having a high/low voltage pulse train with a duty cycle less than 50%. In some embodiments, the high/low voltage pulse train may be +5V/0V. When the output voltage from the PWM U1 is at high voltage (for example +5V) of the pulse train, the coupling capacitor C1 in the capacitively isolated gate drive 210 provides an AC coupled replica of the output voltage signal as a plurality of isolated pulses to the gate of the switching transistor M2, while the returning capacitor C6 provides an AC coupled return path for the current flowing through the coupling capacitor C1. The arrival of the plurality of isolated pulses of high voltage at the gate of the switching transistor M2 turns on the switching transistor M2, which then samples the power supply output voltage across the primary winding L1 of the feedback transformer T1. The sampled power supply output voltage is mirrored on the secondary winding L3 of the feedback transformer T1, where the sampled voltage is peak detected by the diode D2 and the capacitor C2. The peak sampled voltage (i.e., the sampled voltage) is then divided down by the resistors R3 and R4 of the voltage divider circuit 230 to provide feedback to the PWM U1.

Subsequently, when the output voltage from the PWM U1 is at low voltage (for example 0V) of the pulse train, the coupling capacitor C1 in the capacitively isolated gate drive 210 provides an AC coupled replica of the output voltage signal as a plurality of isolated pulses to the gate of the switching transistor M2, while the returning capacitor C6 provides an AC coupled return path for the current flowing through the coupling capacitor C1. The diode D4 conducts the current during this time, which clamps negative excursions on the gate of the switching transistor M2 to a diode drop below ground. While the output voltage from the PWM U1 remains at low voltage, the core of the feedback transformer T1 is reset using a reset mechanism such as, but not limited to, the reset winding L2, which provides a reset path for current within the feedback transformer T1. The discharge time constant of resistors R3/R4 and the capacitor C2 allow the feedback signal to increase or decrease as needed, in response to line, load, and temperature changes. The example regulated power supply 200 depicted in FIG. 2 provided the following performance characteristics under test: worst-case output voltage regulation over line (24 V-36 V), load (5 A to 10 A), and temperature (−34° C. to +81° C.) was −1.64%/+2.12%.

Figure 5:
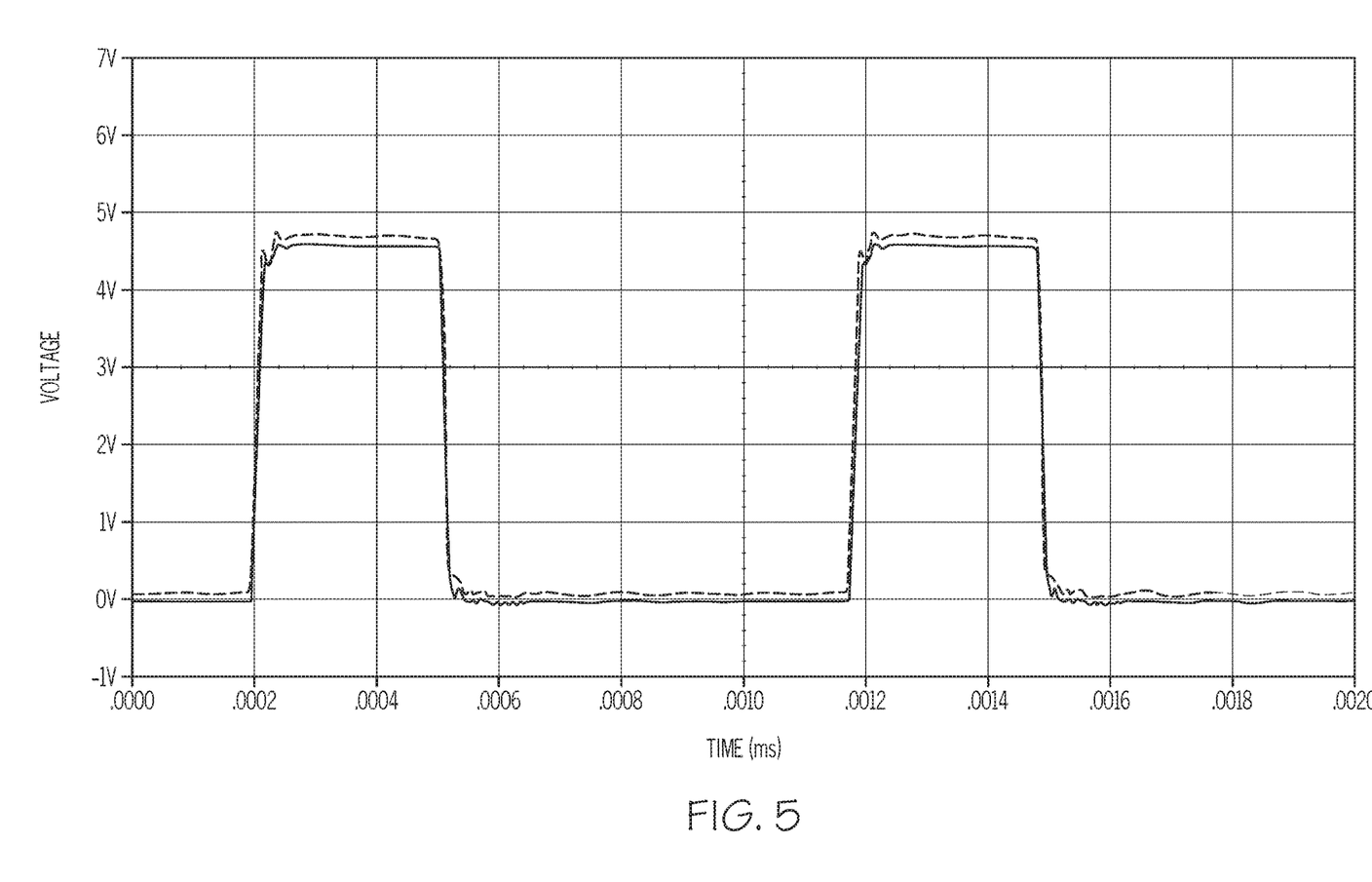
FIG. 5 depicts an example graphical comparison of voltage waveforms over time for primary-side gate driver output and secondary-side gate drive of a switching transistor in the example capacitively isolated feedback circuit, according to one or more embodiments described and illustrated herein.

FIG. 5 depicts an example graphical comparison of voltage waveforms over time for primary-side gate driver output (depicted in solid lines) and secondary-side gate drive of a switching transistor in the example capacitively isolated feedback circuit (depicted in dotted lines). The voltage waveforms are generated when the switching frequency of the regulated power supply 200 in FIG. 2 is set to 1 MHz and a GaN FET is used as the switching transistor M2. The primary-side gate driver output driving the coupling capacitor C1 and the returning capacitor C6 is determined using an oscilloscope probe connected between the output pin Output of the PWM U1 and the ground pin GND of the PWM U1 in FIG. 2. The secondary-side gate drive of the switching transistor M2 is determined using an oscilloscope probe connected between the gate and the source of the switching transistor M2 in FIG. 2. As shown in FIG. 5, voltage waveforms from both oscilloscope probes lay almost on top of each other, thus indicating low waveform distortion and thus the near preservation of the detected electrical signal by the capacitively isolated feedback circuit 210.

Figure 3:
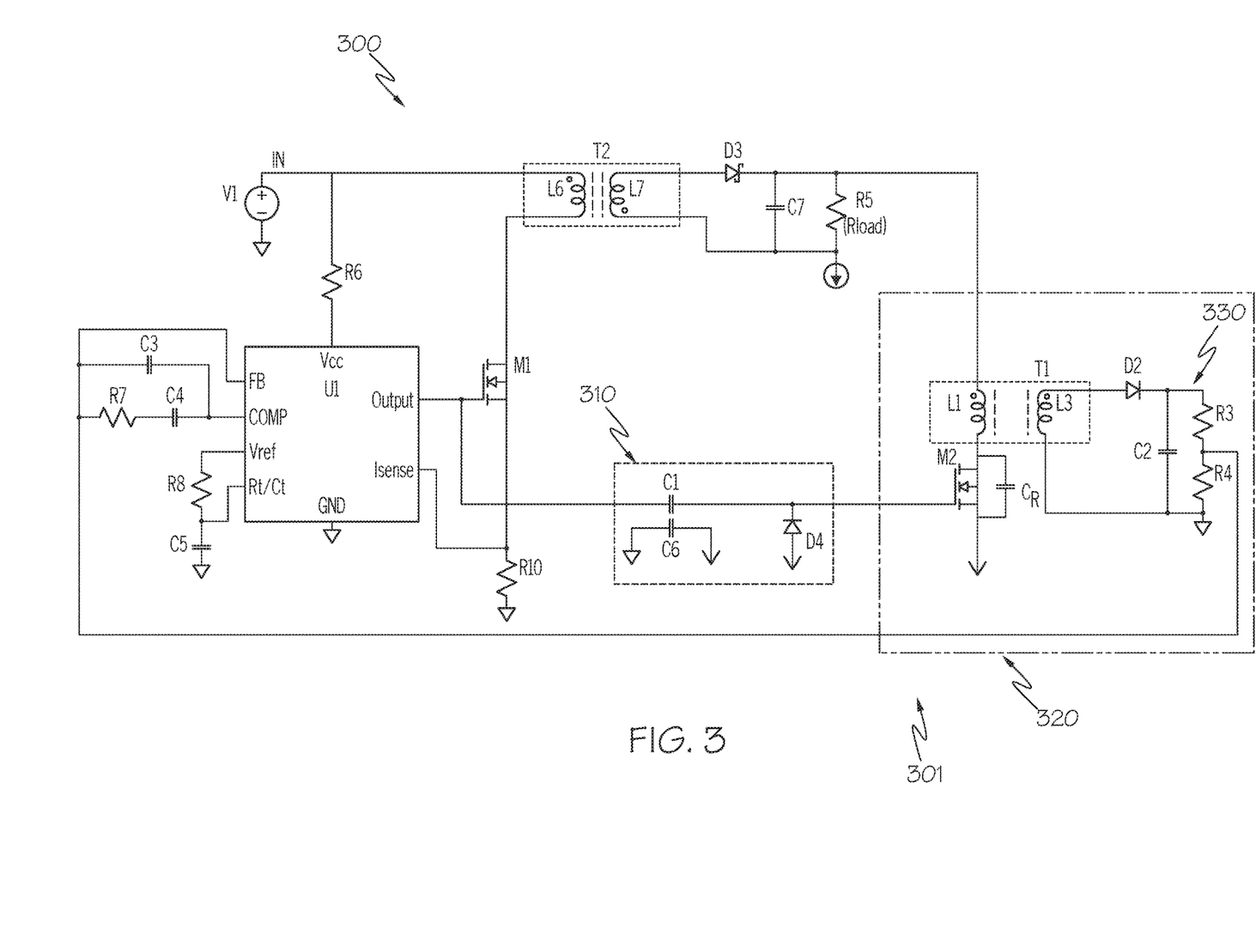
FIG. 3 schematically depicts an example regulated power supply incorporating an example capacitively isolated feedback circuit where a feedback transformer of the example capacitively isolated feedback circuit incorporates a resonant reset mechanism to reset a core of the feedback transformer, according to one or more embodiments described and illustrated herein.
Figure 4:
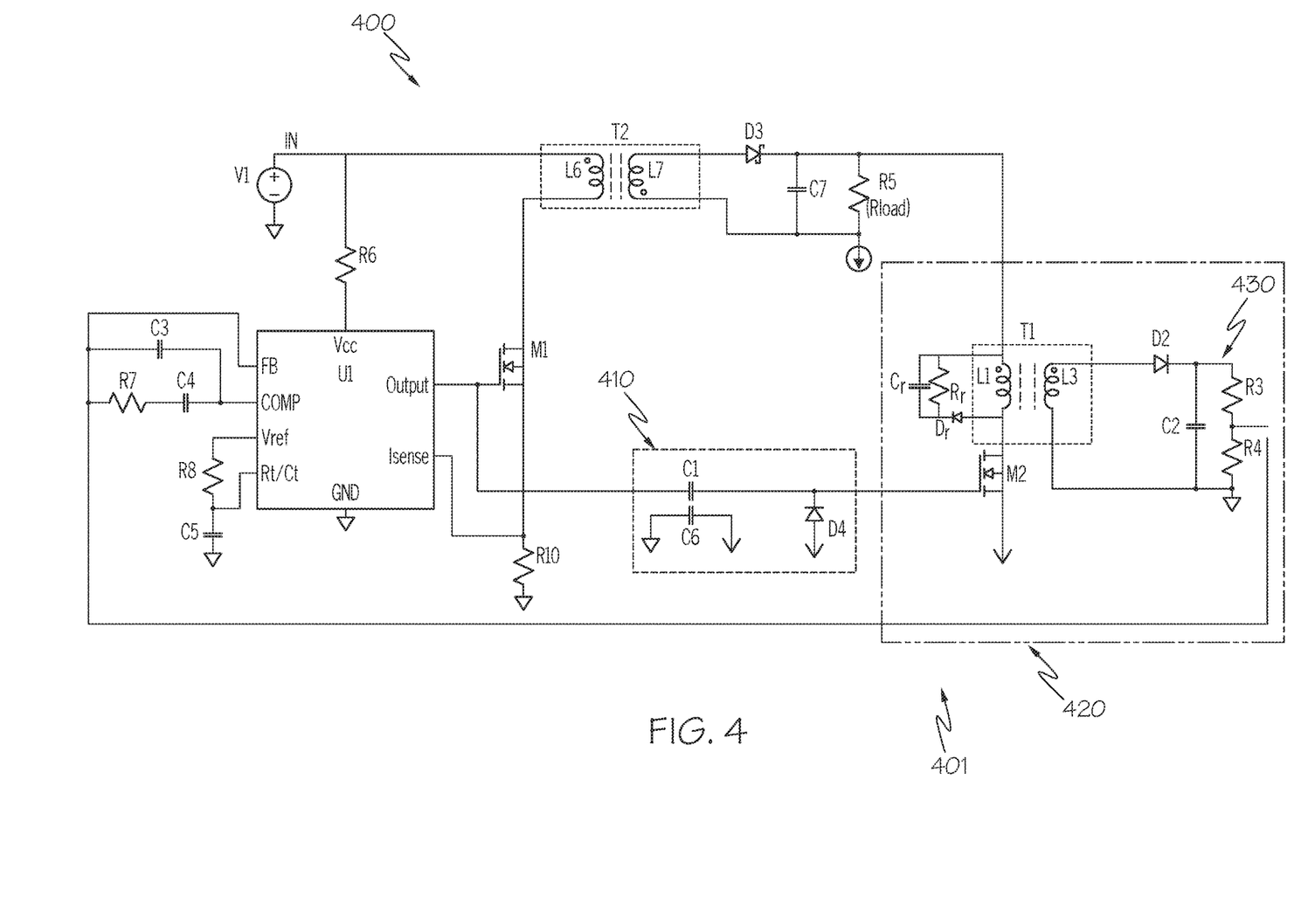
FIG. 4 schematically depicts an example regulated power supply incorporating an example capacitively isolated feedback circuit where a feedback transformer of the example capacitively isolated feedback circuit incorporates an RCD clamp reset mechanism to reset a core of the feedback transformer, according to one or more embodiments described and illustrated herein.

FIGS. 2-4 schematically depict example regulated power supplies 200, 300, 400 incorporating example capacitively isolated feedback circuits 201, 301, 401 where the feedback transformer T1 incorporates different core reset mechanisms that reset the magnetic core of the feedback transformer T1 every switching cycle to avoid saturation. In FIG. 2, the feedback transformer T1 incorporates a reset winding L2 to reset a core of the feedback transformer T1. The reset winding L2 is electrically coupled to ground shared with the secondary winding L7 of the output transformer T2 and the load R5 via the diode D1. An anode of the diode D1 is electrically coupled to the reset winding L2 and a cathode of the diode D1 is electrically coupled to the load R5. When the switching transistor M2 turns on, magnetizing current flows through the primary winding L1 of the feedback transformer T1. When the switching transistor M2 turns off, magnetizing current flows through the diode D1 and the reset winding L2. Thus the reset winding L2 provides a reset path for magnetizing current within the feedback transformer T1 in order to reset the core of the feedback transformer T1.

In FIG. 3, the primary winding L1 of the feedback transformer T1 in a forward converter feedback circuit 320 of the example capacitively isolated feedback circuit 301 is electrically coupled to a resetting capacitor $C_R$, which is electrically connected in parallel to the switching transistor M2 (or alternatively, the drain-to-source capacitance of the switching transistor M2). When the switching transistor M2 turns on, magnetizing current flows through the primary winding L1 of the feedback transformer T1. When the switching transistor M2 turns off, the magnetizing current flows into the resetting capacitor $C_R$ until the voltage across the resetting capacitor $C_R$ is greater than the input voltage, which forces the magnetizing current flowing through the primary winding L1 to reverse direction and thereby resetting the core of the feedback transformer T1. Thus the resetting capacitor $C_R$ provides a reset path for current within the feedback transformer T1 in order to reset the core of the feedback transformer T1.

In FIG. 4, the feedback transformer T1 in a forward converter feedback circuit 420 of the example capacitively isolated feedback circuit 401 is electrically coupled to a resistor-capacitor-diode (RCD) clamp circuit comprising a resistor $R_r$, a capacitor $C_r$, and a diode $D_r$. When the switching transistor M2 turns on, magnetizing current flows through the primary winding L1 of the feedback transformer T1. When the switching transistor M2 turns off, the magnetizing current flows into the switching transistor M2 until the drain voltage at the switching transistor M2 is limited by the RCD clamp circuit such that the current breaks down through the diode $D_r$ and flows into the RCD clamp circuit. Thus, the RCD clamp circuit provides a reset path for current within the feedback transformer T1 in order to reset the core of the feedback transformer T1. While in the embodiment shown in FIG. 4, the reset method uses the drain-to-source capacitance of the switching transistor M2, in alternative embodiments, a resetting capacitor $C_R$, which is electrically connected in parallel to the switching transistor M2 may be used, as shown in FIG. 3.

The example capacitively isolated feedback circuits 201, 301, 401 may be used in telemetry and other high-efficiency applications. In particular, capacitively isolated feedback circuit 201, 301, 401 may be used to send analog or digital telemetry across an isolation barrier. This may be useful in sending discrete telemetry from a secondary side component back to the primary side component, such as a spacecraft. For isolated telemetry applications, only the following components are needed: the switching transistor M2 (driven by an FPGA, oscillator, periodic pulse, etc.), the feedback transformer T1, the diode D1, the diode D2, the feedback capacitor C2, and the voltage divider circuit 230, 330, 440. Both GaN FETs or MOSFETs operate equally well as the switching transistor M2. In particular, the use of GaN FETs enables operation when the switching frequency of the M1 switch is well above 1 MHz.

The capacitively isolated feedback circuits described herein provide several advantages over conventional isolated feedback circuits. The capacitively isolated feedback circuits form a reusable building block that can provide any power supply with a tightly regulated output voltage. Further, embodiments described herein do not require a secondary-side oscillator integrated circuit (IC). Additionally, the incorporation of the feedback windings into the main transformer can be avoided, thereby eliminating changes to feedback performance when the main transformer is modified. Finally, variation and high-stress conditions in the gate drive of the switching transistor with changes in input voltage and output load are virtually eliminated. This problem is inherent in implementations that drive the switching transistor from the secondary winding of the main transformer.

The components described herein may be implemented using any parts grade. As a non-limiting example, the components of the capacitively isolated feedback circuits may be fabricated from radiation-hardened components, such as from space-grade rad/SEE-hard to commercial rad/SEE-soft. Thus, the capacitively isolated feedback circuits described herein may be incorporated in power supplies deployed in space or nuclear applications, for example.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A regulated power supply comprising:
a pulse width modulator operable to produce a plurality of pulses at an output and receive a sampled voltage at a feedback input thereof; and
a capacitively isolated feedback circuit comprising:
a capacitively isolated gate drive circuit directly coupled to the output of the pulse width modulator, the capacitively isolated gate drive circuit comprising:
a coupling capacitor providing a current path between the output of the pulse width modulator and the gate of the switching transistor configured to produce a plurality of isolated pulses from the plurality of pulses received from the output of the pulse width modulator; and
a returning capacitor directly coupled to a source of the switching transistor and a ground of the pulse width modulator, wherein the source of the switching transistor is directly coupled to a ground of a primary of the feedback transformer; and
a forward converter feedback circuit comprising:
a switching transistor directly coupled to the capacitively isolated gate drive circuit for receiving the plurality of isolated pulses at a gate of the switching transistor; and
a feedback transformer coupled to the pulse width modulator for providing the sampled voltage at the feedback input, wherein the plurality of isolated pulses causes the feedback transformer to sample a voltage at a load as the sampled voltage.

2. The regulated power supply of claim 1, wherein:
a switching frequency of the regulated power supply is between about 1 KHz and about 1 MHz; and
the switching transistor is a metal-oxide-semiconductor-field-effect-transistor (MOSFET).

3. The regulated power supply of claim 1, wherein:
a switching frequency of the regulated power supply is greater than about 1 KHz; and
the switching transistor is a gallium-nitride field-effect-transistor (GaN FET).

4. The regulated power supply of claim 1, wherein the capacitively isolated gate drive circuit further comprises a diode having an anode and a cathode, the anode electrically coupled to the source of the switching transistor and the cathode electrically coupled between the coupling capacitor and the gate of the switching transistor.

5. The regulated power supply of claim 4, wherein the diode is a Schottky diode.

6. The regulated power supply of claim 4, wherein the diode is a P-N Junction diode having a reverse recovery time between about 0.5 nanoseconds to about 500 nanoseconds.

7. The regulated power supply of claim 1, wherein the coupling capacitor and the returning capacitor have capacitance between about 0.5 picoFarad to about 10 microFarad.

8. The regulated power supply of claim 1, wherein the coupling capacitor and the returning capacitor have self-resonant frequency higher than the switching frequency of the regulated power supply.

9. The regulated power supply of claim 1, wherein:
the forward converter feedback circuit further comprises a voltage divider electrically coupled to the feedback transformer; and
the sampled voltage is present at an output of the voltage divider.

10. The regulated power supply of claim 1, wherein the feedback transformer comprises a feedback primary electrically coupled to a drain of the switching transistor and a feedback secondary, wherein the feedback primary is operable to be electrically coupled to the load.

11. The regulated power supply of claim 10, wherein the forward converter feedback circuit further comprises:
a diode electrically coupled to the feedback secondary and the voltage divider; and
a feedback capacitor electrically connected in parallel to the voltage divider.

12. The regulated power supply of claim 10, wherein the feedback transformer further comprises a third winding providing a reset path for magnetizing current within the feedback transformer.

13. The regulated power supply of claim 10, wherein the feedback transformer is electrically coupled to a resetting capacitor providing a reset path for current within the feedback transformer, wherein the resetting capacitor is electrically connected in parallel to the switching transistor.

14. The regulated power supply of claim 10, wherein the feedback transformer is electrically coupled to a resistor-capacitor-diode (RCD) clamp circuit providing a reset path for current within the feedback transformer.

15. The regulated power supply of claim 1, wherein the capacitively isolated feedback circuit is fabricated from radiation-hardened components.

16. A regulated power supply having a switching frequency greater than about 1 MHz, the regulated power supply comprising:
a pulse width modulator operable to produce a plurality of pulses at an output and receive a sampled voltage at a feedback input thereof; and
a capacitively isolated feedback circuit comprising:
a capacitively isolated gate drive circuit directly coupled to the output of the pulse width modulator, the capacitively isolated gate drive circuit comprising:
a coupling capacitor providing a current path between the output of the pulse width modulator and the gate of the switching transistor configured to produce a plurality of isolated pulses from the plurality of pulses received from the output of the pulse width modulator; and
a returning capacitor directly coupled to a source of the switching transistor and a ground of the pulse width modulator, wherein the source of the switching transistor is directly coupled to a ground of a primary of the feedback transformer; and
a forward converter feedback circuit comprising:
a switching transistor directly coupled to the capacitively isolated gate drive circuit for receiving the plurality of isolated pulses at a gate of the switching transistor, wherein the switching transistor is a gallium-nitride field-effect-transistor (GaN FET); and
a feedback transformer coupled to the pulse width modulator for providing the sampled voltage at the feedback input, wherein the plurality of isolated pulses causes the feedback transformer to sample a voltage at a load as the sampled voltage.

17. The regulated power supply of claim 16, wherein the capacitively isolated gate drive circuit further comprises:
a diode having an anode and a cathode, the anode electrically coupled to the source of the switching transistor and the cathode electrically coupled between the coupling capacitor and the gate of the switching transistor.

18. The regulated power supply of claim 17, wherein:
the coupling capacitor and the returning capacitor have capacitance between about 1 nanoFarad to about 1 microFarad;
the coupling capacitor and the returning capacitor have self-resonant frequency higher than the switching frequency of the regulated power supply; and
the diode is a P-N Junction diode having a reverse recovery time between about 0.5 nanoseconds to about 500 nanoseconds.

* * * * *